US010757679B2

(12) United States Patent
Laselva et al.

(10) Patent No.: US 10,757,679 B2
(45) Date of Patent: Aug. 25, 2020

(54) CONTROLLING COMMUNICATION DEVICES BY ACTIONS TRIGGERED BY PAGING

(71) Applicant: Nokia Solutions and Networks Oy, Espoo (FI)

(72) Inventors: Daniela Laselva, Klarup (DK); Frank Frederiksen, Klarup (FI)

(73) Assignee: Nokia Solutions and Networks Oy, Espoo (FI)

( * ) Notice: Subject to any disclaimer, the term of this patent is extended or adjusted under 35 U.S.C. 154(b) by 62 days.

(21) Appl. No.: 15/513,422

(22) PCT Filed: Oct. 6, 2014

(86) PCT No.: PCT/EP2014/071344
§ 371 (c)(1),
(2) Date: Mar. 22, 2017

(87) PCT Pub. No.: WO2016/055088
PCT Pub. Date: Apr. 14, 2016

(65) Prior Publication Data
US 2017/0311281 A1    Oct. 26, 2017

(51) Int. Cl.
H04W 68/02        (2009.01)
H04W 72/04        (2009.01)

(52) U.S. Cl.
CPC ......... *H04W 68/02* (2013.01); *H04W 68/025* (2013.01); *H04W 72/0446* (2013.01)

(58) Field of Classification Search
None
See application file for complete search history.

(56) References Cited

U.S. PATENT DOCUMENTS

2009/0061916 A1*  3/2009  Kim .................... H04W 72/005
                                                      455/466
2011/0003603 A1*  1/2011  Park .................... H04W 68/02
                                                      455/458

(Continued)

FOREIGN PATENT DOCUMENTS

WO     2016/020005 A1    2/2016

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.1.0, Jun. 2014, pp. 1-35.

(Continued)

*Primary Examiner* — Anh Ngoc M Nguyen
(74) *Attorney, Agent, or Firm* — Harrington & Smith

(57) ABSTRACT

Methods and apparatuses are disclosed for controlling communications devices. An access node can generate a message for at least one communication device for transmission at a resource determined at least partly on the basis of a first identifier value assigned to said at least one communication device. The generation comprises including in the message at least one other identifier value, wherein the other identifier values are assigned to communication devices for a purpose of addressing messages to communication devices. The at least one other identifier value is used exclusively for said at least one communication device at said resource and is recognisable to said at least one communication device as instruction to take one or more actions associated with the at least one other identifier value. A communication device can check for a message at the resource, the checking comprising checking in the message for the one or more other identifier values. In response to detecting one or more of said one or more other identifier values, said communication device can take one or more actions associated with said (Continued)

detected one or more of said one or more other identifier values.

17 Claims, 4 Drawing Sheets

(56) References Cited

U.S. PATENT DOCUMENTS

2013/0115977 A1* 5/2013 Chandramouli ........ H04W 4/70
                                                              455/458
2013/0208667 A1   8/2013 Merlin et al.

OTHER PUBLICATIONS

"3rd Generation Partnership Project; Technical Specification Group Radio Access Network; User Equipment (UE) procedures in idle mode and procedures for cell reselection in connected mode (Release 12)", 3GPP TS 25.304, V12.2.0, Jun. 2014, pp. 1-56.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.2.0, Jun. 2014, pp. 1-365.

International Search Report and Written Opinion received for corresponding Patent Cooperation Treaty Application No. PCT/EP2014/071344, dated Jun. 11, 2015, 12 pages.

* cited by examiner

CONTROLLING COMMUNICATION DEVICES BY ACTIONS TRIGGERED BY PAGING

RELATED APPLICATION

This application was originally filed as PCT Application No. PCT/EP2014/071344 filed Oct. 6, 2014.

This disclosure relates to communications in a wireless communication system and more particularly to controlling communication devices.

A communication system can be seen as a facility that enables communications between two or more nodes such as fixed or mobile communication devices, access points such as base stations, servers, machine type devices and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

In a communication system signals can be carried on wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A base station can provide one or more cells, there being various different types of base stations and cells.

A user can access the communication system by means of an appropriate communication device or terminal. Communication apparatus of a user is often referred to as a user equipment (UE). Typically a communication device is used for enabling receiving and transmission of communications such as speech and data. A communication device is typically provided with an appropriate signal receiving and transmitting arrangement for enabling communications with other parties. A communication device, for example user equipment (UE) has conventionally communicated in a cellular system with another communication device via a network node such as a base station. Several base stations may be involved in communications between the communication devices. For example, modern radio communication networks, such as the Long Term Evolution (LTE) or the LTE-Advanced (LTE-A) of the 3rd Generation Partnership Project (3GPP) can use mobile architecture known as the Evolved Universal Terrestrial Radio Access Network (E-UTRAN). Base stations of such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access system include those provided by base stations of systems that are based on technologies such as wireless local area network (WLAN) and/or WiMax (Worldwide Interoperability for Microwave Access).

One conventional technique by which a network access node controls a communication device in idle mode involves triggering a communication device to initiate a random access procedure by transmitting a paging message including an identifier value exclusive to the communication device. The random access procure leads to establishment of a radio resource control (RRC) connection by which the network access node can provide the communication device with dedicated instructions.

The inventors for the present invention have identified a desire for an alternative technique for controlling communication devices in idle mode.

In accordance with an embodiment there is provided a method comprising: checking at a communication device for a message at a resource associated with a first identifier value assigned to the communication device, the checking comprising checking in the message for one or more other identifier values, wherein the other identifier values are assigned to communication devices for a purpose of addressing messages to communication devices; and in response to detecting one or more of said one or more other identifier values, taking at said communication device one or more actions associated with said detected one or more of said one or more other identifier values.

In accordance with another embodiment there is provided a method, comprising: generating at an access node a message for at least one communication device for transmission at a resource determined at least partly on the basis of a first identifier value assigned to said at least one communication device, the generation comprising including in the message at least one other identifier value, wherein the other identifier values are assigned to communication devices for a purpose of addressing messages to communication devices and the at least one other identifier value is used exclusively for said at least one communication device at said resource and is recognisable to said at least one communication device as instruction to take one or more actions associated with the at least one other identifier value.

In accordance with another embodiment there is provided an apparatus for a communication device, the apparatus comprising at least one processor, and at least one memory including computer program code, wherein the at least one memory and the computer program code are configured, with the at least one processor, to cause the apparatus to check for a message at a resource associated with a first identifier value assigned to the communication device, the checking comprising checking in the message for one or more other identifier values, wherein the other identifier values are assigned to communication devices for a purpose of addressing messages to communication devices, and in response to detection of one or more of said one or more other identifier values, take one or more actions associated with said detected one or more of said one or more other identifier values.

In accordance with another embodiment there is provided an apparatus for controlling at least one communication device, the apparatus comprising at least one processor, and at least one memory including computer program code, wherein the at least one memory and the computer program code are configured, with the at least one processor, to cause the apparatus to generate a message for the at least one communication device for transmission at a resource determined at least partly on the basis of a first identifier value assigned to said at least one communication device, the generation of the message comprising inclusion in the message of at least one other identifier value, wherein the other identifier values are assigned to communication devices for a purpose of addressing messages to communication devices and the at least one other identifier value is used exclusively for said at least one communication device at said resource and is recognisable to said at least one communication device as instruction to take one or more actions associated with the at least one other identifier value.

In accordance with a more specific embodiment the one or more other identifier values are equal to identifier values assigned to other communication devices configured not to check for messages in said resource.

Said resource may comprise one or more subframes within one or more time frames. Said resource may comprise paging occasions associated with said first identifier value. The association may be according to one or more formulae including as variables said first identifier value and one or more of: the number of time frames in a paging cycle; and the number of subframes used for paging within a time frame.

The one or more other identifier value may be of different type than the first identifier value. The first identifier value is the international mobile subscriber identity for the communication device. The one or more other identifier values may be temporary identity values.

A network element may configure at least one communication device to check for said one or more identifier values and/or create the one or more pre-associated action via dedicated signalling or broadcasting.

The number of identifiers to be checked by a communication device may be limited. According to an embodiment system information is transmitted in a form accessible to a plurality of communication devices about association of modified identifier values in paging messages with actions to be performed at a communication device in response to detecting said modified identifier values.

An apparatus for controlling at least one communication device may also be provided, the apparatus comprising at least one processor, and at least one memory including computer program code, wherein the at least one memory and the computer program code are configured, with the at least one processor, to cause the apparatus to transmit system information in a form accessible to a plurality of communication devices about association of modified identifier values in paging messages with actions to be performed at a communication device in response to detecting said modified identifier values.

A computer program comprising program code means adapted to perform the herein described methods may also be provided. In accordance with further embodiments apparatus and/or computer program product that can be embodied on a computer readable medium for providing at least one of the above methods is provided A communications device adapted for the operation can also be provided. A network node such as a controller for a base station or another access point or a controller for core network may be configured to operate in accordance with at least some of the embodiments. A communication system embodying the apparatus and principles of the invention may also be provided.

It should be appreciated that any feature of any aspect may be combined with any other feature of any other aspect.

Hereunder is provided, by way of example only, a detailed description of techniques related to the repeated transmission of scheduling assignments for random access response message, with reference to the accompanying drawings, in which:

FIG. 1 illustrates an example of a group of communication devices (UE) 8 within the coverage area of at least one access node (e.g. eNodeB) 2 of a radio access network. FIG. 1 only shows two access nodes 2, but a radio access network will typically comprise a large number of access nodes collectively covering a wide, continuous coverage area.

FIG. 2 shows a schematic view of an example of user equipment 8 that may be used for communicating with at least the eNBs 2 of FIG. 1 via a wireless interface. The user equipment (UE) 8 may be used for various tasks such as making and receiving phone calls, for receiving and sending data from and to a data network and for experiencing, for example, multimedia or other content.

Figure 1:
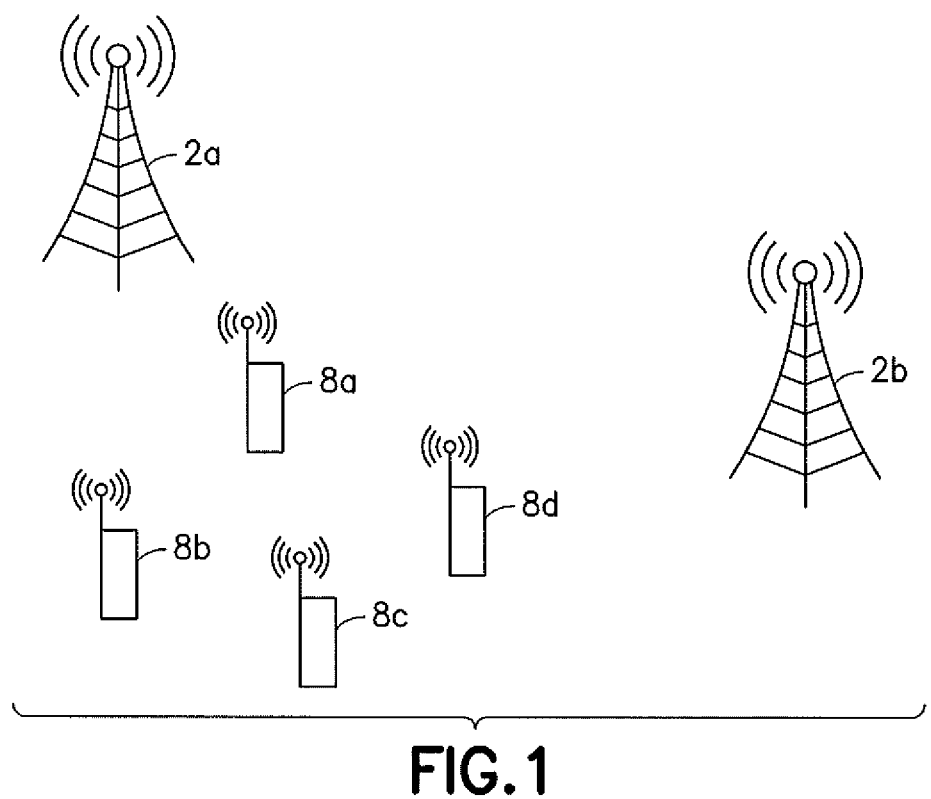
FIG. 1 illustrates an example of communication devices in communication with an access node of a radio access network.

The UE 8 may be any device capable of at least sending or receiving radio signals to or from at least the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement 205. The antenna arrangement may be arranged internally or externally to the UE 8, and may include a plurality of antennas capable of operating in a multi-layer transmission scheme.

The UE 8 may be provided with at least one data processing entity 203 and at least one memory or data storage entity 217 for use in tasks it is designed to perform. The data 213 processing entity 203 and the at least one memory or data storage entity 217 may be provided on an appropriate circuit board and/or in chipsets of the UE 8.

Figure 2:
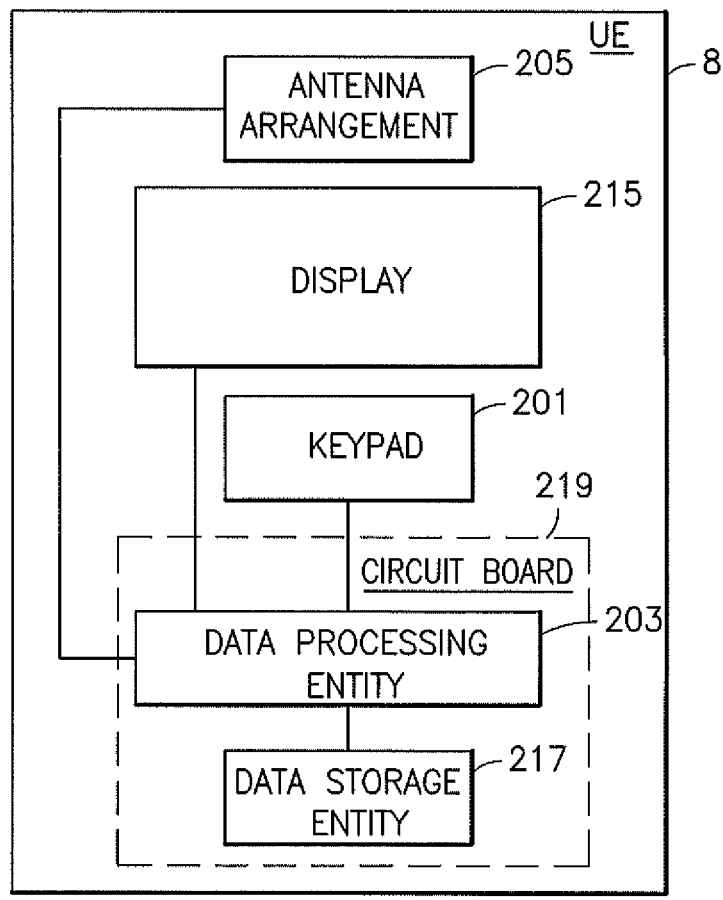
FIG. 2 illustrates some components of one example of user equipment as shown in FIG. 1.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto. FIG. 2 shows an example of a UE including a user interface, but the UE may also be a communication device without any user interface, such as a device that is designed for machine type communications (MTC).

Figure 3:
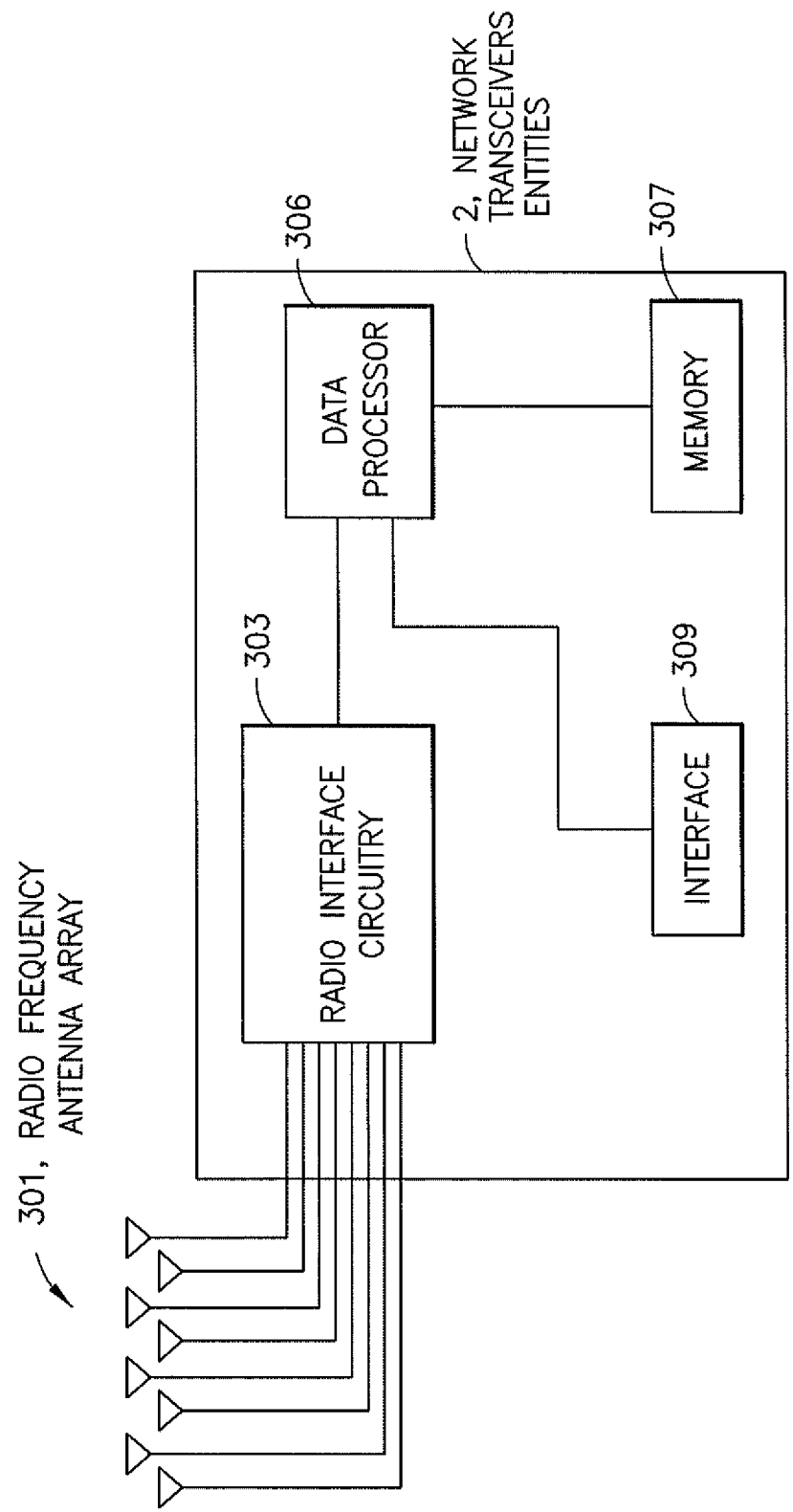
FIG. 3 illustrates some components of an example of an apparatus suitable for the access nodes shown in FIG. 1.

FIG. 3 shows an example of apparatus for use at the network transceiving entities 2 of FIG. 1 The apparatus comprises a radio frequency antenna array 301 configured to receive and transmit radio frequency signals; radio frequency interface circuitry 303 configured to interface the radio frequency signals received and transmitted by the antenna array 301 and the data processor 306. The radio frequency interface circuitry 303 may also be known as a transceiver. The apparatus also comprises an interface 309 via which it can send and receive information to and from one or more other network nodes such as other eNBs 2. The data processor 306 is configured to process signals from the radio frequency interface circuitry 303, control the radio frequency interface circuitry 303 to generate suitable RF signals to communicate information to the UE 8 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

Figure 4:
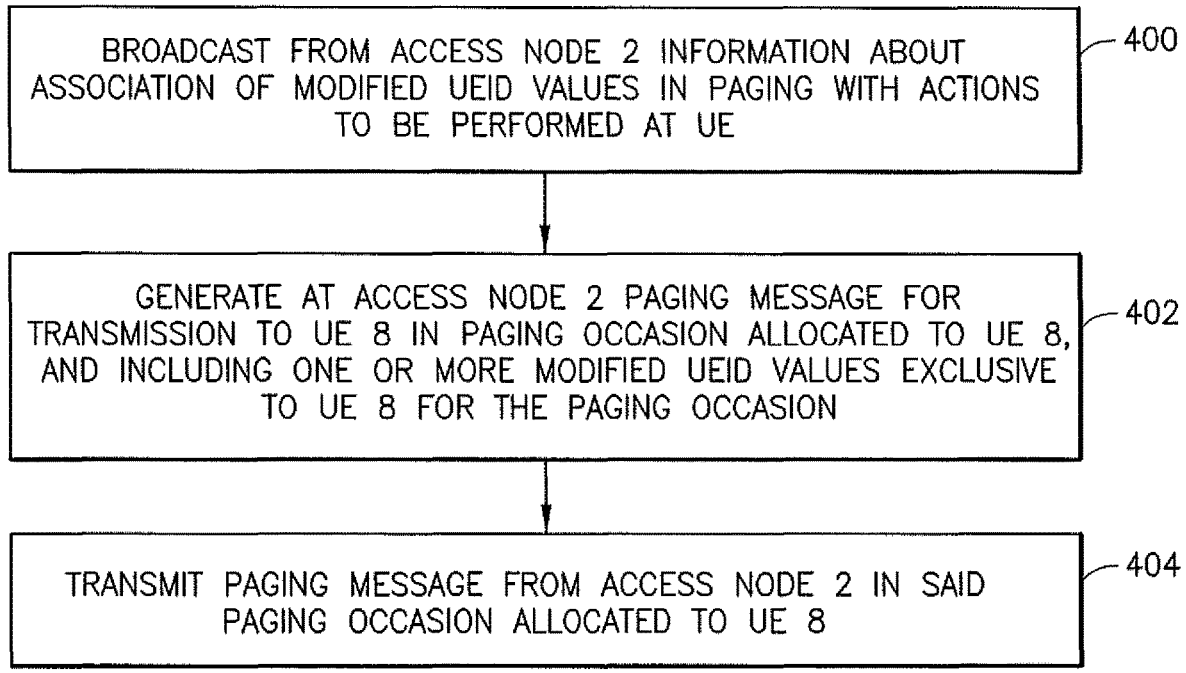
FIG. 4 illustrates an example of a set of operations at an access node in one embodiment of the present invention.
Figure 5:
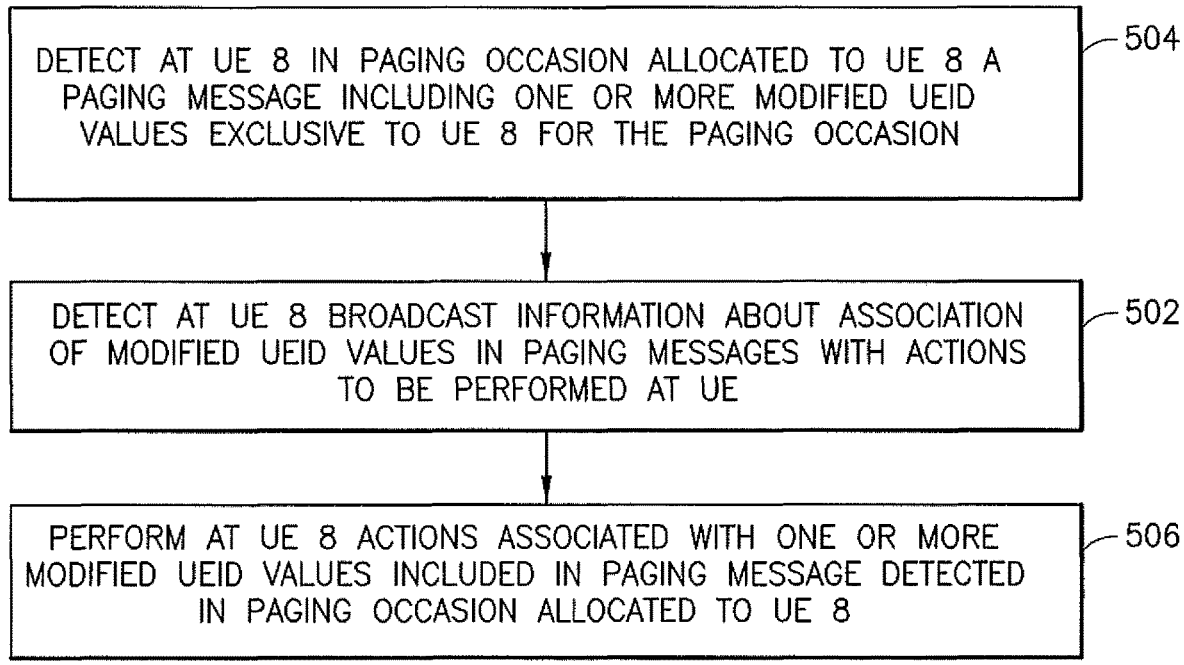
FIG. 5 illustrates an example of a set of operations at a communication device in one embodiment of the present invention.

FIGS. 4 and 5 illustrate an example of operations at access node 2 and UE 8 according to a technique by which the access node triggers the communication device to transfer traffic from a wireless local area network (WLAN) to a LTE radio access network operated by the access node, without establishing a RRC connection to communicate the instruction. This is just one example of an action that can be triggered at the UE by this technique. Other illustrative examples include: triggering the UE to release dedicated RAN provisioned thresholds for the purpose of WLAN networking; triggering the UE to do IDLE mode cell-reselection to UTRAN if connected to E-UTRAN; and triggering the UE to do IDLE mode cell-reselection to E-UTRAN if connected to UTRAN, etc.

The eNB 2 first identifies one or more frames and subframes (paging occasion) at which to transmit a paging message for UE 8, i.e. determines paging occasions at which UE 8 is configured to check for paging messages. In this example, the paging occasions for a UE are as specified in 3GPP TS 36.304, according to which the frame indexes in which the UE checks for paging messages are given by the formula:

$$SFN \bmod T = (T \operatorname{div} N)*(UE\_ID \bmod N)$$

and the time offset (from the start of the frame) at which UE checks for paging messages is given by the formula:

$$i\_s = \operatorname{floor}(UE\_ID/N) \bmod Ns$$

wherein T specifies the number of frames in a paging cycle, and may e.g. have the values 32, 64, 128 and 256; Nb is the number of sub-frames used for paging within a frame, and may e.g. have the values 4T, 2T, ½T, ¼T, ⅛T, 1/16T or 1/32T; N is the smaller of T and Nb (i.e. min (T, Nb)); Ns is the larger of 1 and Nb/T (i.e. max (1, Nb/T)); and UE_ID is IMSI mod 1024, wherein IMSI is the International Mobile Subscriber Identity unique to the UE. T is determined as the shortest of the UE specific DRX value (if allocated by upper layers) and a default DRX value included in system information broadcast by the network to which eNB 2 belongs.

For this technique, the network is configured to use values of T and Nb by which two or more consecutive UE_IDs are associated with different SFN indexes for paging messages, according to the formula above. For example, if the paging parameters T and Nb are set to be 32 and T/8 respectively, then four consecutive UEIDs will be associated with different SFN indexes. As a function of UEID, the paging SFN for the range UEID=128 to UEID=139 is shown in the table below for this example.

| UEID | SFN |
|---|---|
| 128 | 0 |
| 129 | 8 |
| 130 | 16 |
| 131 | 24 |

-continued

| UEID | SFN |
|---|---|
| 132 | 0 |
| 133 | 8 |
| 134 | 16 |
| 135 | 24 |
| 136 | 0 |
| 137 | 8 |
| 138 | 16 |
| 139 | 24 |

The paging message transmitted at a paging occasion may include information elements (Paging Records IEs) for more than one UE whose UEID is associated with the same paging occasion.

Hereunder, we shall designate X as the UE_ID for the UE 8 at which the eNB wishes to quickly trigger some action.

The eNB 2 generates a paging message including a Paging Record IE for UE 8 (UEID=X) (STEP 402 of FIG. 4).

Instead of including the UEID value of X in the Paging Record IE for UE 8, the eNB includes the UEID value of X+1 in the Paging Record IE for UE 8 (e.g. includes the UEID value of 129 where X=128). The UE for which UE_ID=X+1 is not an UE that checks for paging messages at the same paging occasion as the UE for which UE_ID=X, and it is therefore possible to avoid any risk that the UE for which UEID=X+1 will react to the paging message. It may be explicitly specified in the specification defining the operation of UEs that a UE should react to a paging message including an UEID value for that UE only when the paging message is detected at a paging occasion associated with the UE according to the formula above.

The eNB 2 transmits the paging message for UE 8 (UEID=X) at a paging occasion determined according to the formula given above (STEP 404 of FIG. 4).

The UE 8 (UEID=X) checks for paging messages at all paging occasions determined by the formulae mentioned above. The UE 8 not only checks for paging messages including an UEID value of X, but also checks for paging messages including UEID values of X+1, X+2 and X+3. In this example, UE 8 detects a paging message including the UEID value of X+1 and recognises the paging message including this UEID value as an instruction for UE 8 to onload its traffic from WLAN to LTE (STEP 502 of FIG. 5). UE 8 then proceeds to follow the instruction pre-associated with the UEID value of X+1, i.e. in this example, proceeds to initiate the process of onloading its traffic from WLAN to LTE (STEP 504 of FIG. 5).

Information about which modified UEIDs equate to what action(s) may, for example, be included in system information broadcast by the eNB 2 (STEP 400 of FIG. 4) and accessible by all UEs within the coverage area of eNB 2 (STEP 500 of FIG. 5). For example, the system information broadcast by eNB 2 may additionally indicate that: a UE with a UE_ID=X should recognise a paging message with a UEID value of X+2 as an instruction to release dedicated RAN provisioned thresholds for the purpose of WLAN interworking; and a UE with a UE_ID=X should recognise a paging message with a UEID value of X+3 as an instruction to do IDLE mode cell-reselection to UTRAN from E-UTRAN.

These modified UEID values (X+n, where n=1, 2, 3 etc.) can be considered as secondary UEID values for the UE. They are not totally exclusive to the UE (because they are used to identify other UEs), but they are exclusive to the UE for paging messages in all paging occasions allocated to the UE.

In the case where the network is set up with values of T and Nb for which the formula above gives a greater number of consecutive UEIDs with all different paging SFNs, the system information broadcast by eNB 2 may additionally specify actions for paging messages including modified UEID values of X+4 and greater.

The paging message for UE 8 may indicate more than one modified UEID value that the UE recognises as an instruction to perform a predetermined action; and, in response, the UE would proceed to perform all actions associated with the plurality of such modified UEID values.

With the above-described technique, it is possible for the access node to quickly provide instructions to dedicated UEs in IDLE mode by bypassing the need to first establish an RRC connection by which to send the instructions. This could be particularly effective for specific mobility and traffic steering such as e.g. onload from/offload to WLAN.

In the example described above, the ISMI is used as the UE_ID in the formula for determining the paging occasion for a UE and as the basis for indicating instructions in a paging message, but the same results may also be achieved with the use of other identifiers. In accordance with another example, the first identifier used in determining the paging occasion is IMSI while the identifiers used to address a paging message to a device are of different type, for example a temporary identifier such as s-TMSI (SAE-Temporary Mobile Subscriber Identity). Thus the second identifier can be of the same type or a different type as the first identifier.

The above example is described with a reference to a paging resource. However, the invention is not limited by this but the principles can be applied to other resources can than a paging occasion. Examples of the other resources include another resource in time than the paging occasion. Resources in other domains can also be defined such as frequency and code.

Figure 6:
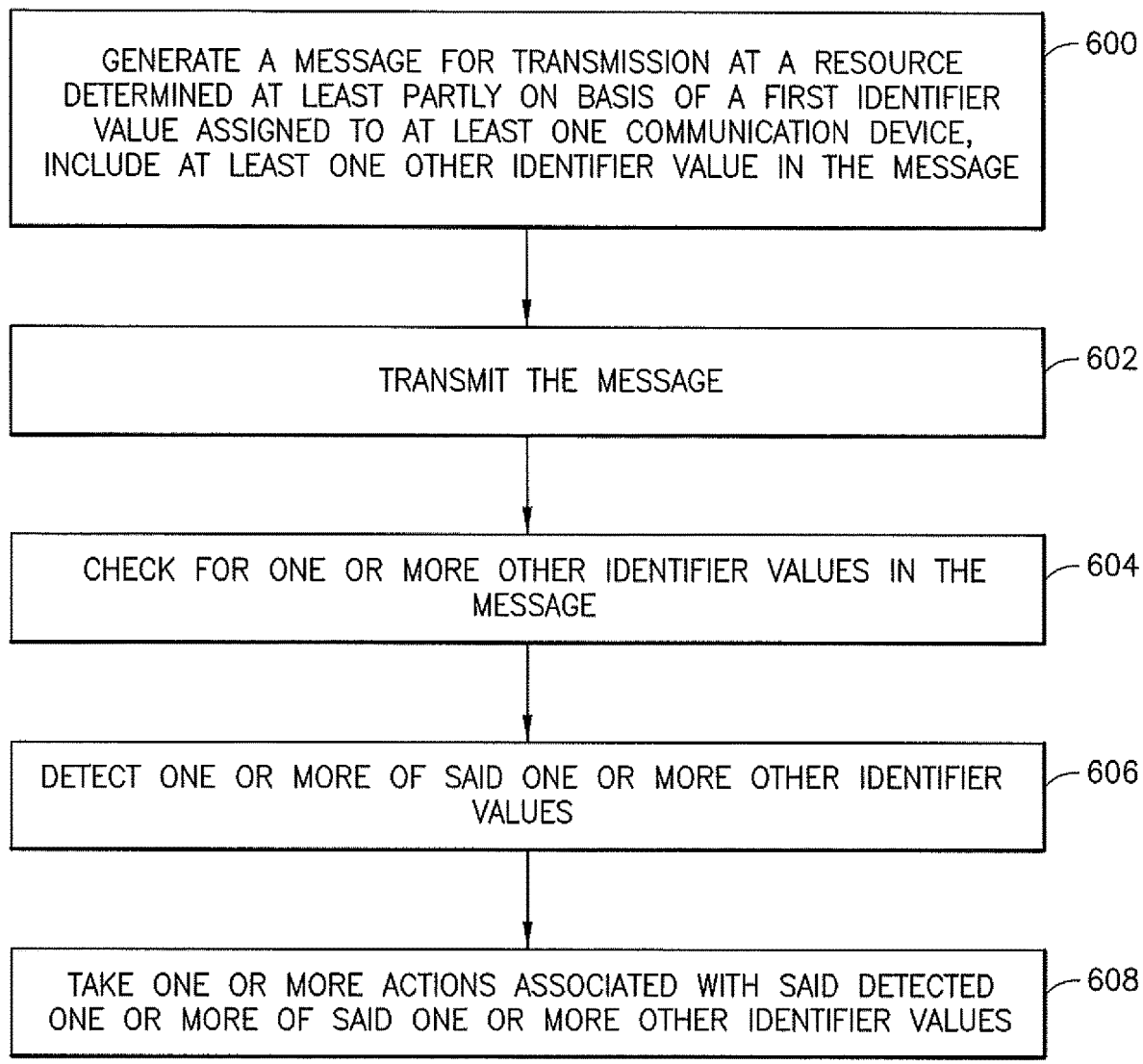
FIG. 6 illustrates an example of a set of operations at an access node and operations at a communication device in one embodiment.

FIG. 6 shows a flowchart in accordance with an embodiment. An access node generates at 600 a message for at least one communication device for transmission at 602 at a resource determined at least partly on the basis of a first identifier value assigned to said at least one communication device. The generation comprises including in the message at least one other identifier value. The at least one other identifier value is one of identifiers that are assigned to communication devices for a purpose of addressing messages to communication devices. The at least one other identifier value is used exclusively for said at least one communication device at said resource and is recognisable to said at least one communication device as instruction to take one or more actions associated with the at least one other identifier value.

FIG. 6 shows further operation at a communication device. The device checks at 604 for one or more other identifier values in the message. In response to detecting one or more of said one or more other identifier values at 606, said communication device takes at 608 one or more actions pre-associated with said detected one or more of said one or more other identifier values. The one or more other identifier values can be equal to identifier values assigned to other communication devices configured not to check for messages in said resource.

The resource such as the paging occasion or other resource can be defined for a predefined set of communication devices rather than all devices.

In accordance with a possibility a network entity, for example an eNB or another access point, or a core network entity, can be adapted to configure a communication device or a set of communication devices to listen for specific secondary identifiers and create the associated actions and/or rules for the behaviour in case of a required action. This can be provided for example via dedicated RRC messages or other dedicated signalling.

An association between the secondary identifiers and the rules can be generated. It is also possible to limit the secondary identifiers and rules to a limited set. For example, if it is possible to have 15 or 31 additional identifiers, is may be desired not to force a communication device to test against all of these but only a limited number.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method, comprising:
   generating at an access node a message for at least one communication device of a communication network for transmission at a resource determined at least partly on the basis of a first identifier value associated with a user identification of said at least one communication device,
   the generation comprising including in the message at least one other identifier value, wherein the at least one other identifier value is used for said at least one communication device, wherein the at least one other identifier value is assigned to communication devices for a purpose of addressing messages to communication devices and the at least one other identifier value is used exclusively for said at least one communication device at said resource and is recognizable to said at least one communication device as instruction to take one or more actions associated with the at least one other identifier value, and wherein the at least one other identifier value comprises one or more other identifier values, and wherein the one or more other identifier values are equal to other identifier values assigned to other communication devices configured not to check for messages in said resource.

2. The method according to claim 1, wherein said resource comprises one or more subframes within one or more time frames.

3. The method according to claim 1, wherein said resource comprises paging occasions associated with said first identifier value according to one or more formulae including as variables said first identifier value and one or more of:
   the number of time frames in a paging cycle; and
   the number of subframes used for paging within a time frame.

4. The method according to claim 1, wherein the one or more other identifier values are for use by the at least one communication device to perform one of traffic onload or traffic offload between a wireless local area network and long term evolution network associated with the at least one communication device.

5. The method according to claim 1, wherein at least one of the first identifier value is the international mobile subscriber identity for the at least one communication device or wherein the one or more other identifier values are temporary identity values.

6. The method according to claim 1, further comprising: configuring by at least one communication device to at least one of check for said one or more other identifier values or create the one or more pre-associated action via dedicated signalling or broadcasting.

7. The method according to claim 1, further comprising: limiting the number of identifiers to be checked by a communication device.

8. An apparatus for a communication device, the apparatus comprising
   at least one processor, and
   at least one memory including computer program code, wherein the at least one memory and the computer program code are configured, with the at least one processor, to cause the apparatus to
   check for a message at a resource associated with a first identifier value associated with a user identification of the communication device,
   the checking comprising checking in the message for one or more other identifier values, wherein the one or more other identifier values are used for said communication device,
   wherein the one or more other identifier values are assigned to communication devices for a purpose of addressing messages to communication devices, and in response to detection of one or more of said one or more other identifier values, take one or more actions associated with said detected one or more of said one or more other identifier values, and wherein the one or more other identifier values are equal to other identifier values assigned to other communication devices configured not to check for messages in said resource.

9. An apparatus for controlling at least one communication device, the apparatus comprising:
   at least one processor, and
   at least one memory including computer program code, wherein the at least one memory and the computer program code are configured, with the at least one processor, to cause the apparatus to:
   generate a message for the at least one communication device for transmission at a resource determined at least partly on the basis of a first identifier value associated with a user identification of said at least one communication device,
   the generation of the message comprising inclusion in the message of at least one other identifier value, wherein the at least one other identifier value is used for said at least one communication device, and
   wherein the at least one other identifier value is assigned to communication devices for a purpose of addressing messages to communication devices and the at least one other identifier value is used exclusively for said at least one communication device at said resource and is recognizable to said at least one communication device as instruction to take one or more actions associated with the at least one other identifier value, and
   wherein the one or more other identifier values are equal to other identifier values assigned to other communication devices configured not to check for messages in said resource.

10. The apparatus according to claim 8, wherein said resource comprises one or more subframes within one or more time frames.

11. The apparatus according to claim 8, wherein said resource comprises paging occasions associated with said first identifier value according to one or more formulae including as variables said first identifier value and one or more of:
    the number of time frames in a paging cycle; and
    the number of subframes used for paging within a time frame.

12. The apparatus according to claim 8, wherein the one or more other identifier values are for use by the communication device to perform one of traffic onload or traffic offload between a wireless local area network and long term evolution network associated with the communication device.

13. The apparatus according to claim 8, wherein at least one of the first identifier value is the international mobile subscriber identity for the communication device or wherein the one or more other identifier values are temporary identity values.

14. The apparatus according to claim 8, further comprising:
    at least one of configuring the communication device to check for said one or more identifier values or creating the one or more pre-associated action via dedicated signalling or broadcasting.

15. The apparatus according to claim 8, configured to limit the number of identifiers to be checked by the communication device.

16. The apparatus according to claim 9, wherein said resource comprises paging occasions associated with said first identifier value according to one or more formulae including as variables said first identifier value and one or more of: the number of time frames in a paging cycle; and the number of subframes used for paging within a time frame.

17. The apparatus according to claim 9, wherein at least one of the first identifier value is the international mobile subscriber identity for the communication device or the one or more other identifier values are temporary identity values.

\* \* \* \* \*